United States Patent Office 2,861,107
Patented Nov. 18, 1958

2,861,107

PROCESS FOR THE PRODUCTION OF CUMENE HYDROPEROXIDE

Kizo Hiratsuka, Fujisawa-shi, and Ei Ichi Yonemitsu, Takashi Itabashi, Shigehiro Date, and Shotaro Keimatsu, Tokyo, Japan, assignors to Edogawa Kagaku Kogyo Kabushiki Kaisha, Tokyo, Japan No Drawing. Application August 17, 1956
Serial No. 604,616

Claims priority, application Japan August 22, 1955

8 Claims. (Cl. 260—610)

This invention relates to improvements in the process for the production of cumene hydroperoxide, and particularly to the process for the production of cumene hydroperoxide by means of treating cumene with molecular oxygen at an elevated temperature.

Heretofore, various processes have been proposed for the production of cumene hydroperoxide by the oxidation of cumene with molecular oxygen at an elevated temperature. According to the emulsifying process for instance, molecular oxygen is introduced into a mixture of cumene and water, whereto sodium stearate, sodium naphthenate, etc. has been added as an emulsifier, at a temperature between 80° and 90° C. in the presence of an alkali. This process is not only slow in oxidizing velocity, but also requires disadvantageously an operation of separating the resultant emulsion of the reaction product into two phases. According to the so-called dry processes where water is not used, cumene is oxidized at a temperature between 110° and 120° C. and formaldehyde added as starting material thereto in a ratio of one-thousandth of cumene in weight, or a trace of either of cobalt stearate or manganese stearate having been added thereto as starting material is brought to react.

In the process for the production of cumene hydroperoxide by the oxidation of cumene with molecular oxygen at an elevated temperature, the presence of impurities such as phenol, α-methylstyrene, etc. causes the lowering of the oxidation velocity or even leads to the entire interruption of the oxidation. Furthermore, the oxidation is said to be obstructed by the presence of either an alcohol or an amine.

Notwithstanding such a common view on amine, we have found that a catalytic amount of ethylenediamine tetraacetic acid, a derivative of amine, and alkali salts thereof are excellent oxidizing accelerators for the oxidation of cumene with oxygen or oxygen containing gas such as air at an elevated temperature.

One object of this invention is to provide excellent accelerators for the oxidation of cumene.

Another object of this invention is to provide processes whereby cumene hydroperoxide may be obtained with high efficiency.

According to this invention, in the presence of ethylenediamine tetraacetic acid or alkali salts thereof cumene is agitated vigorously while a stream of oxygen or air is passed through the reaction mixture. The reaction is carried out at a temperature between 90° and 130° C.,

| At the end of hours of reaction time | 1 | 2 | 3 | 4 | 5 | 6 | 7 | 8 |
|---|---|---|---|---|---|---|---|---|
| Ex. 1—No accelerator used | 2.8 | 3.8 | 4.7 | 5.6 | 6.6 | 7.5 | 8.7 | 9.4 |
| Ex. 2—Ethylenediamine tetraacetic acid as accelerator $$\begin{array}{c}\phantom{CH^2-N}\diagup COOH\\ CH^2-N\diagdown COOH\\ |\phantom{CH^2-N}\diagup COOH\\ CH^2-N\diagdown COOH\end{array}$$ | 4.3 | 4.8 | 7.2 | 9.5 | 11.1 | 13.3 | 15.8 | 17.7 |
| Ex. 3—Di-sodium salt of ethylenediamine tetraacetic acid as accelerator $$\begin{array}{c}\phantom{CH^2-N}\diagup COOH\\ CH^2-N\diagdown COONa\\ |\phantom{CH^2-N}\diagup COOH\\ CH^2-N\diagdown COONa\end{array}$$ | 3.6 | 4.8 | 7.2 | 10.7 | 13.5 | 16.9 | 20.7 | |
| Ex. 4—Tri-sodium salt of ethylenediamine tetraacetic acid as accelerator $$\begin{array}{c}\phantom{CH^2-N}\diagup COONa\\ CH^2-N\diagdown COONa\\ |\phantom{CH^2-N}\diagup COONa\\ CH^2-N\diagdown COOH\end{array}$$ | 3.6 | 5.0 | 7.5 | 10.8 | 13.5 | 16.8 | 20.5 | |
| Ex. 5—Tetra-sodium salt of ethylenediamine tetraacetic acid as accelerator $$\begin{array}{c}\phantom{CH^2-N}\diagup COONa\\ CH^2-N\diagdown COONa\\ |\phantom{CH^2-N}\diagup COONa\\ CH^2-N\diagdown COONa\end{array}$$ | 3.8 | 5.1 | 8.2 | 11.0 | 13.5 | 16.8 | 20.6 | |
| Ex. 6—Di-barium salt of ethylenediamine tetraacetic acid as accelerator $$\begin{array}{c}\phantom{CH^2-N}\diagup COOBa\\ CH^2-N\diagdown COO\\ |\phantom{CH^2-N}\diagup COOBa\\ CH^2-N\diagdown COO\end{array}$$ | 4.0 | 4.8 | 8.9 | 9.8 | 12.0 | 14.4 | 17.7 | 21.6 | preferably between 105° and 110° C. Although 1 percent in weight of the accelerator based on cumene was used in the examples described hereinafter, lesser quantity of the accelerator may be used satisfactorily in practice because the latter is very slightly soluble in cumene.

Examples 1 percent (2.2 g.) of finely divided ethylenediamine tetraacetic acid or one of salts thereof was added to 220 g. of cumene involving 2 percent (4.4 g.) of cumene hydroperoxide. Keeping the mixture at a temperature of 105° C. and stirring it vigorously, 7 liters per hour of pure oxygen were passed through the mixture. It is known that the addition of small amount of hydroperoxide, as an initiator to the reaction mixture in the oxidation of this nature reduces the induction period of the oxidation. For comparing the results with each other in these examples, a same quantity (2 percent) of cumene hydroperoxide obtained by another means was mixed into each sample of the starting material previously. A small amount of the reactant was taken out every hour and the percentage of hydroperoxide contained therein was determined by iodometry. The results are shown in the table. The percentage is indicated by weight throughout these examples.

At the beginning of the oxidation, the concentration of cumene hydroperoxide was 2 percent by weight of the cumene to be oxidized. (Accelerator was added 1 percent by weight of the cumene used.)

Among these additives including ethylenediamine tetraacetic acid, di-sodium salt, tri-sodium salt, tetra-sodium salt thereof, and a barium salt thereof, we found that di-sodium salt, tri-sodium salt and tetra-sodium salt are most excellent as shown by the examples. It will be seen from the foregoing table that at the end of the seventh hour, 2.4 times as much hydroperoxide is obtained in the presence of di-, tri-, or tetra-sodium salt of ethylenediamine tetraacetic acid as is in the absence of an accelerator, while in the presence of di-barium salt of ethylenediamine tetraacetic acid or of free ethylenediamine tetraacetic acid, 1.7 times as much hydroperoxide is obtained as in the absence of an accelerator. Although pure oxygen was used in these examples as a molecular oxygen, air also may be utilized. At about 20 percent in concentration of cumene hydroperoxide the yield was approximately 93 percent of cumene consumed.

We claim:

1. In a process for the production of cumene hydroperoxide wherein cumene is oxidized by a gas selected from the group consisting of molecular oxygen and oxygenous gases at an elevated temperature, a step of adding thereto ethylenediamine tetraacetic acid in a ratio up to 1 percent of cumene used as accelerator.

2. Process of producing cumene hydroperoxide from cumene, comprising the steps of mixing cumene with accelerator selected from the group consisting of ethylenediamine tetraacetic acid, its sodium salts and it di-barium salt in a ratio about 1 percent of accelerators to the total weight of cumene and reacting the mixture with agitation with oxygen at a temperature between 90° and 130° C.

3. A process for producing cumene hydroperoxide as claimed in claim 2 comprising the step of including cumene hydroperoxide as initiator to the mixture.

4. Process for the production of cumene hydroperoxide by the oxidation of cumene comprising the steps of bringing cumene into contact with oxygen at a temperature between 90° and 130° centigrade in the presence of about 1 percent of ethylenediamine tetraacetic acid as an accelerator and with cumene hydroperoxide as an initiator.

5. Process for the production of cumene hydroperoxide by the oxidation of cumene comprising the steps of bringing cumene into contact with oxygen at a temperature between 90° and 130° centigrade in the presence of about 1 percent ethylenediamine tetraacetic acid di-sodium salt as an accelerator and with cumene hydroperoxide as an initiator.

6. Process for the production of cumene hydroperoxide by the oxidation of cumene comprising the steps of bringing cumene into contact with oxygen at a temperature between 90° and 130° centigrade in the presence of about 1 percent of ethylenediamine tetraacetic acid tri-sodium salt as an accelerator and with cumene hydroperoxide as an initiator.

7. Process for the production of cumene hydroperoxide by the oxidation of cumene comprising the steps of bringing cumene into contact with oxygen at a temperature between 90° and 130° centigrade in the presence of about 1 percent of ethylenediamine tetraacetic acid tetra-sodium salt as an accelerator and with cumene hydroperoxide as an initiator.

8. Process for the production of cumene hydroperoxide by the oxidation of cumene comprising the steps of bringing cumene into contact with oxygen at a temperature between 90° and 130° centigrade in the presence of about 1 percent of ethylenediamine tetraacetic acid di-barium salt as an accelerator and with cumene hydroperoxide as an initiator.

References Cited in the file of this patent

UNITED STATES PATENTS

| | | |
|---|---|---|
| 2,674,629 | Scriabine | Apr. 6, 1954 |
| 2,734,086 | Goppel et al. | Feb. 7, 1956 |